3,334,607
TRAWLER
Alexandre Chardome, 27 Rue Gerard David,
Bruges, Belgium
Filed Feb. 19, 1965, Ser. No. 433,997
8 Claims. (Cl. 114—.5)

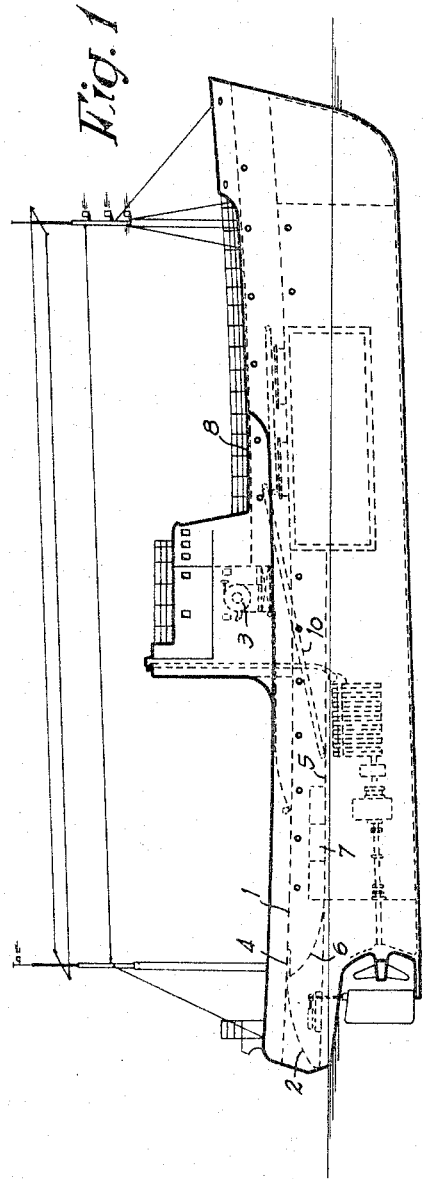
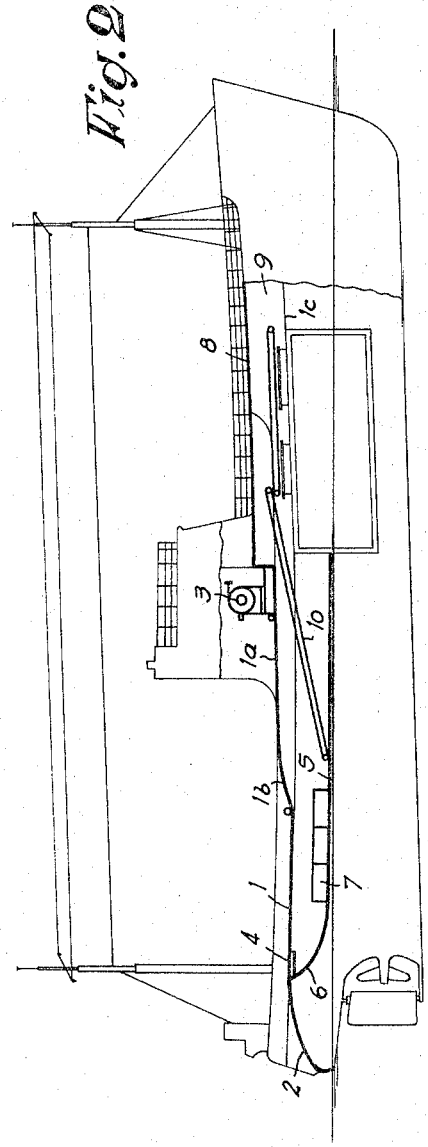

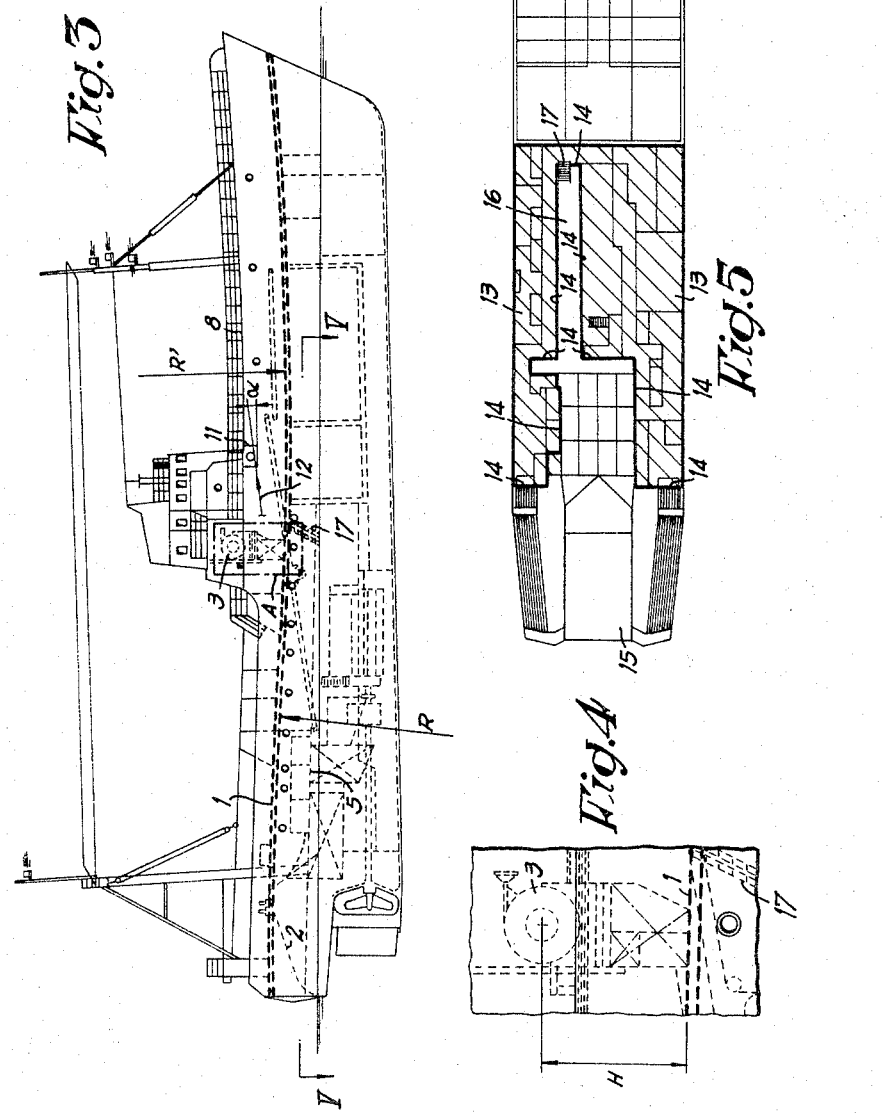

In the construction technology of trawlers in order to improve their efficiency, the volume of processed products, the facilities and safety of operation, it is essential to take duly into account the compromise which must be established between the bulk of the equipment and the room needed for repairing the trawl, on the one hand, and the areas required for collecting, cleaning, processing and storing the catch, on the other hand. And in this compromise, it is essential to think of evacuating the washing water, the offal and the refuse of the catch.

In the traditional trawlers, the fish is hauled on board sideways and poured directly onto a deck situated on top of the fishhold.

This deck which is already fairly encumbered by various items such as the fishing winch, the derricks and the countershaft drums, is disposed in a way which leaves sufficient room for sorting the fish, to gut and to head it, to wash it with plenty of water and, may be, to put it into boxes or crates.

In this traditional type of construction, any repairs to the net must be carried out on this same deck, whilst the washing water, the refuse and similar useless matter is best cast overboard straightaway.

This comparatively simple construction is however not very comfortable and is likely to limit considerably the efficiency of the work.

It has been suggested to substitute for this traditional type of construction, a trawler characterized for instance by the presence of two superimposed decks of which the lower one, which has been called "main deck" and the top one which has been called "fishing deck."

At the stern, the trawler has a ramp leading up to aforesaid "fishing deck" which carries, among other things, the winch or equivalent gear for hauling the trawl and comprises at least one hatch for pouring the fish onto aforesaid "lower deck" where it is being washed and processed.

This kind of construction has however the disadvantage of making it difficult to evacuate the washing water and the waste. If aforesaid "main deck" is not sufficiently high above water level, the direct evacuation which is carried out by large scupper-holes with flaps may, under certain circumstances endanger the ship and, in any case, expose aforesaid "main deck" to be flooded in rough seas.

On the other hand, if for eliminating this drawback, aforesaid "main deck" is built sufficiently high above water level, aforesaid "fishing deck" lies at a level which is considerably higher than that which is required for using a stern ramp.

For doing away with these drawbacks, it is frequently being decided to purely and simply give up the direct evacuation of the cleaning water and the waste. The latter is converted on board into fish meal, whilst the soiled water flows into an inner container and is discharged overboard by special pumps.

The object of the present invention is to provide a trawler the design of which is such that it makes it possible to do away with aforesaid disadvantages. Apart from that, it has the additional advantages of a comparatively simple construction and, above all, to allow the handling and subsequent processing of the fish to be performed under conditions of maximum comfort and safety.

The trawl, with its catch, can also be hoisted along the stern ramp and be brought to an area which is ready to receive it and let it be discharged. This same area can subsequently be used for inspecting and repairing the net if needed.

This construction is moreover such that it makes it possible to empty the entire contents of the net into an underlying compartment which is, so to say, a filling compartment for the conveyors leading to various processing spots before storage into the hold. The washing water and the waste can be directly discharged into the sea without any of the dangers which were mentioned before.

The trawler according to the present invention and of the type comprising a stern ramp leading to the exposed deck which supports the trawl hauling device or devices, is mainly characterized by the fact that, under aforesaid "exposed deck," there is a storage platform, that on aforesaid "exposed deck" have been disposed the washing and processing workshops, and that, between aforesaid lower storage platform and aforesaid upper washing and processing workshops, all the required handling gear has been provided.

It is not only desirable that aforesaid "exposed deck" should have a continuous area, but also and mainly that there should be no part on aforesaid "exposed deck" which would have a dangerous slope, whilst it is indispensable that it should provide, on top of the various parts of the storage platform, the free heights which are required. With this object in view and according to the actual improvements, it is suggested to provide toward the rear part of aforesaid "exposed deck," a zone with a radius of curvature directed downward, at least in its axial part.

An example of embodiment shows a considerably flattened sine-shaped curve.

The hauling device, or devices for the trawl will conveniently be raised with respect to the "exposed deck," and this heightening may lead to having aforesaid hauling device or devices at a level which may reach or even rise above the forecastle.

It may also be an advantage to dispose, at a level which is equal or nearly equal to that of said device or devices, and on either side of the latter and toward the bows, a pulling device capable of exerting a slanting and upward pull onto the trawl in order to make the latter fold back over itself. This characteristic design of aforesaid hauling means does not only make it easier to fold back the trawl, but it also causes the latter to take up a minimum of space and to be properly stowed away. The hauling device in question may be either a winch, a tackle or any similar convenient gear.

The whole of the engine room and of all or some stern fixtures situated under the "exposed deck" may easily be arranged in such way as to be included in a single watertight compartment right up to the "exposed deck." Such type of construction considerably increases the safety of the vessel in case of damage.

Finally, in special cases, as for instance when adequate pumping means and devices for disposing of the waste are available, the processing shop might be at the level of the storage platform whilst the freezing shop would be at the level of the "exposed deck." In this case, the processing would be considered as a pretreatment and the freezing as the actual process.

The overall disposition as well as the complementary characteristics will be clearly understood from the description given hereafter without any limiting purpose and with reference to the appended drawings in which:

FIGURE 1 is a diagrammatic side view of a trawler according to the present invention;

FIGURE 2 is similar to FIGURE 1, but illustrates, in a longitudinal section, the main parts;

FIGURE 3, similar to FIGURE 1, is a diagrammatic illustration of another kind of embodiment;

FIGURE 4 illustrates, on an enlarged scale, the part indicated by A in FIGURE 3;

FIGURE 5 is a section by a plane whose trace follows the straight line V—V of FIGURE 3.

In the embodiment illustrated in FIGURES 1 and 2, the trawler is provided, amongst other things, with an "exposed deck" 1 to which the stern ramp 2 is leading. The raised hauling winch 3 is supported by aforesaid "exposed deck." The latter has one or several hatches 4, and is connected to a lower storage platform 5 by at least one chute or other similar device.

Aforesaid platform carries appropriate troughs or containers 7 for accommodating the fish. Part 1a of aforesaid "exposed deck" 1, adjacent to aforesaid hauling gear 3, is also raised and connected to the normal level of aforesaid "exposed deck" by a curved or bulging part 1b of which the shape both in horizontal extension and in elevation duly takes into account the shape of the corresponding part of the net when the latter is normally hoisted onto aforesaid "exposed deck" 1.

Over the front part 1c there is a long forecastle 8 enclosing the shops 9 for washing and processing the fish. These shops may be fitted with tables, conveyors and any other means which may be required for such washing and other processing.

Aforesaid lower platform 5 and aforesaid shops 9 are directly connected and between them there is, in this particular instance, a slanting conveyor 10.

In this kind of construction, the trawl (nonrepresented), with its catch is hoisted on board over the stern ramp 2 and so brought onto the rear part 1 of the "exposed deck." The latter is disposed at a convenient height above sea level. The fish is poured by one or several hatches 4 onto the storage platform 5 by means of a chute 6. The main function of this platform is to clear as fast as possible the "exposed deck" 1 and to act as a reserve of fish for ensuring the continuous feed of the washing and processing shops. In fact, the fish is transferred to aforesaid shops 9 at a convenient rate by any appropriate handling device represented diagrammatically in the figure by the incline 10.

As aforesaid processing shops 9 are disposed at a convenient level with respect to the sea level, we meet in this construction all the advantages resulting from a straight evacuation of the washing water and the processing waste, without any of the aforementioned drawbacks belonging to existing constructions.

It is quite obvious that a first sorting and even, may be, a first washing might quite well be carried out on platform 5, considering that cleaning water which is not soiled by processing waste can be easily disposed of by the ship's pumps.

The characteristic features disclosed by the present invention can be applied in various forms, by different means and in essentially variable relative positions; so for instance, the communication between the "exposed deck" and the storage platform could be provided by another means than a simple chute, such for instance as inclined planes, goods lifts or other similar devices.

The containers on the storage platform could also be designed in any appropriate way and more particularly in order to ensure an adequate feed of the shops by the intermediate mechanical handling device. The latter could in fact consist of a slanting conveyor of any appropriate shape, or also by a combination of vertical elevators and horizontal conveyors.

The washing and processing shops situated at the level of the "exposed deck," generally between the hauling gear for the trawl and the bows of the trawler, could be fitted and/or equipped in any adequate manner, i.e. specially designed in accordance with the intended way of processing and the amount of fish to be processed.

In the form of embodiment illustrated in FIGURES 3, 4 and 5, we meet again the "exposed deck" 1 to which the stern ramp 2 is leading and which supports the raised hauling winch 3. The rear part of aforesaid "exposed deck" has a downward radius of curvature R which is such that it secures with respect to the level of the storage platform 5, the heights and/or the variations of useful height required for providing in the ships a maximum ease and safety of work, of circulation and of handling.

The device 3 for hauling the trawl may in fact be mounted at any convenient height above the "exposed deck" and even reach or be raised above the level of the forecastle 8. By way of example, in FIGURES 3 and 4, the hauling winch 3 has been shown in a position which is considerably higher than that which was shown in the drawings of FIGURES 1 and 2.

Further, FIGURE 3 illustrates as diagrammatically as possible in 11 a hauling device, winch, tackle or suchlike, the cable 12 of which is connected to a convenient point of the trawl (nonrepresented) in such way that the latter is pulled upward and forward at such an angle $\alpha$ that it folds back correctly on itself and in a predetermined position.

Finally, FIGURE 5 shows in 13 the watertight compartment bounded by the continuous partition 14. Toward the front, compartment 15 extends into a passage 16 with which it is integral and which leads to the exit stairs 17 leading to the "exposed deck."

In the most general way, the present invention concerns all and sundry trawlers applying aforesaid characteristic features, either considered as a whole or in particular combinations.

What I claim is:

1. Fishing vessel having a stern ramp leading to the rear upperdeck upon which the net may be drawn, having at least one opening in the rear upperdeck through which the fish enters a room situated under said deck, said room serving for the reception and eventual handling, processing, freezing of the fish, characterized in that the vessel has a second room, whose floor is a deck which is the prolongation of the rear upperdeck in which fish is conveyed and eventually handled, processed, freezed; and at least one adequate installation to convey fish from the under room into the upper room.

2. Fishing vessel according to claim 1, characterized in that one fish hold rises on its total surface unto the floor of said upper room.

3. Fishing vessel according to claim 1, characterized in that one refrigerated hold rises on its total surface unto the floor of said upper room.

4. Fishing vessel according to claim 1, characterized in that one fish hold rises on a part of its surface unto the floor of said upper room.

5. Fishing vessel according to claim 1, characterized in that one refrigerated hold rises on a part of its surface unto the floor of said upper room.

6. Fishing vessel according to claim 1, characterized in that the said upper room is located in a deckhouse.

7. Fishing vessel according to claim 1, characterized in that the said upper room is located in a superstructure.

8. Fishing vessel according to claim 1, characterized in that the said upper room is located in a tween deckspace.

References Cited

UNITED STATES PATENTS

| | | | |
|---|---|---|---|
| 2,413,918 | 1/1947 | Harris | 114—0.5 |
| 2,579,787 | 12/1951 | Burney | 114—0.5 |

FOREIGN PATENTS

| | | |
|---|---|---|
| 1,219,535 | 12/1959 | France. |
| 1,330,871 | 5/1963 | France. |
| 1,351,819 | 12/1963 | France. |
| 1,096,788 | 1/1961 | Germany. |

MILTON BUCHLER, Primary Examiner.

T. M. BLIX, Assistant Examiner.